(12) United States Patent
Hoard et al.

(10) Patent No.: US 8,549,414 B2
(45) Date of Patent: Oct. 1, 2013

(54) UTILIZING SOCIAL RELATIONSHIP INFORMATION TO DISCOVER A RELEVANT ACTIVE MEETING

(75) Inventors: Douglas G. Hoard, Lexington, KY (US); William M. Quinn, Lexington, KY (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/069,663

(22) Filed: Mar. 23, 2011

(65) Prior Publication Data

US 2012/0246574 A1 Sep. 27, 2012

(51) Int. Cl.
*G06F 15/00* (2006.01)
*G06F 13/00* (2006.01)

(52) U.S. Cl.
USPC .......................................... 715/751; 715/732

(58) Field of Classification Search
USPC .......................... 715/732, 781, 751–753, 861
See application file for complete search history.

(56) References Cited

U.S. PATENT DOCUMENTS

| | | | |
|---|---|---|---|
| 7,080,130 B2 | 7/2006 | Aiso | |
| 8,190,679 B1 * | 5/2012 | Gay et al. | 709/204 |
| 2002/0161838 A1 | 10/2002 | Pickover et al. | |
| 2004/0051745 A1 | 3/2004 | Gargi | |
| 2008/0126949 A1 * | 5/2008 | Sharma | 715/751 |
| 2009/0210494 A1 | 8/2009 | Fisher et al. | |
| 2010/0169149 A1 * | 7/2010 | Ju et al. | 705/9 |
| 2010/0272245 A1 | 10/2010 | Brunson | |
| 2012/0173621 A1 * | 7/2012 | Crosbie et al. | 709/204 |

OTHER PUBLICATIONS

Bardram, Jakob E. and Thomas R. Hansen "The AWARE Architecture: Supporting Context-Mediated Social Awareness in Mobile Cooperation"; CSCW '04, Nov. 2-10, 2004, vol. 6, Issue 3. pp. 192-201.

M. Schilit, Bill N. and David M. Hilbert and Jonathan Trevor "Context-Aware Communication"; IEEE Wireless Communications, Oct. 2002. pp. 46-54.

* cited by examiner

*Primary Examiner* — Cao "Kevin" Nguyen
(74) *Attorney, Agent, or Firm* — Patents on Demand P.A.; Brian K. Buchheit; Scott M. Garrett

(57) ABSTRACT

An active meeting can be identified that occurs in a collaborative environment that is an electronic meeting system. The meeting can be associated with a meeting identifier, a ranking value, and/or a plurality of participants. Relationship information of the participants with regard to a specified entity can be determined. Relationship information can include a social network relationship, presence information, and/or collaboration metadata. A ranking value, which is a numerical or alphanumeric value, for the meeting can be programmatically established based on the relationship information.

25 Claims, 3 Drawing Sheets

UTILIZING SOCIAL RELATIONSHIP INFORMATION TO DISCOVER A RELEVANT ACTIVE MEETING

BACKGROUND

The present invention relates to the field of Web conferencing and more particularly to utilizing social relationship information to discover a relevant active meeting.

In many instances, an employee of an organization can be unaware of an ongoing online meeting (e.g., Web conference), referred to herein as an active meeting. In some instances, it is a result of an ad hoc meeting and in other instances, the employee can be inadvertently omitted from receiving a meeting invite; can have forgotten the meeting; or, can be unaware of the meeting room for whatever reason.

BRIEF SUMMARY

One aspect of the disclosure can include an apparatus, a system, an interface, and a method for utilizing social relationship information to discover a relevant active meeting. A meeting within a collaborative environment can be identified. In one embodiment, the meeting can be an active meeting which can be unassociated with an electronic calendar event. The meeting can be associated with a meeting identifier, a ranking value, and one or more participants. The collaborative environment can be an electronic meeting system. The relationship information of the participants to a specified entity can be determined. The relationship information can be a social network relationship, presence information, and collaboration metadata. A ranking value for the meeting based on the relationship information can be programmatically established. The ranking value can be a numerical value and/or an alphanumeric value.

Another aspect of the disclosure can include an apparatus, a method, an interface, and a system for utilizing social relationship information to discover a relevant active meeting. The disclosure can include a data store able to store an active list. The active list can include a meeting identifier and a ranking value associated with an active meeting. A meeting engine can be able to determine the active meeting associated with a collaborative environment. The active meeting is an online meeting not linked with a calendar event. The collaborative environment can be an electronic meeting system.

DETAILED DESCRIPTION

Figure 1:
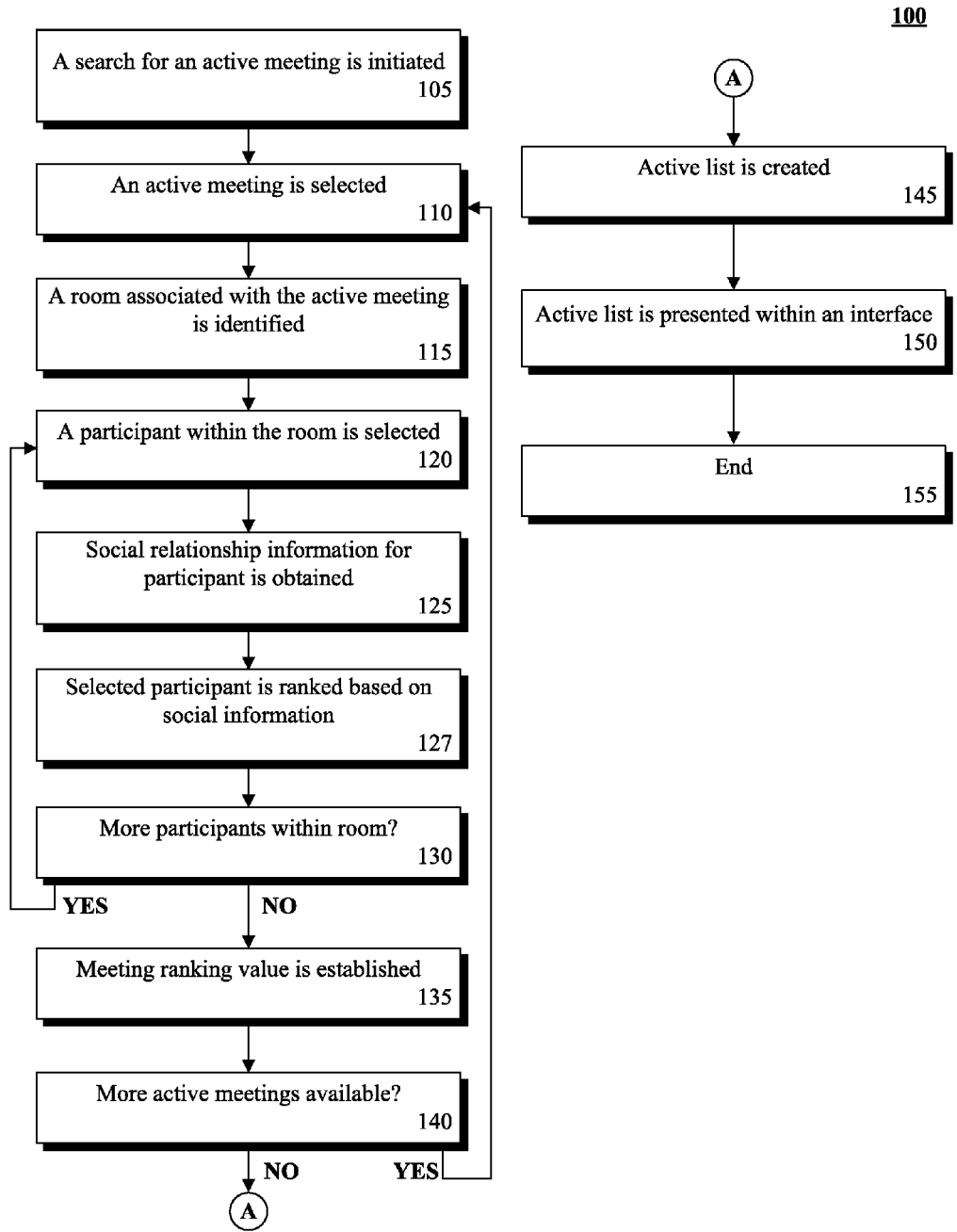
FIG. 1 is a schematic diagram illustrating a method for utilizing social relationship information to discover a relevant active meeting in accordance with an embodiment of the inventive arrangements disclosed herein.

In many instances, barriers can exist which can prevent the rapid discovery of a relevant online meeting room. To discover a relevant online meeting, an employee must either enter an ID for the meeting, examine a list of current active meetings, or search for a meeting by title/owner name. Since an employee can be unaware of appropriate details for the meeting, discovery can be quite difficult.

Further, many limitations exist when an employee is explicitly invited to join a meeting. Due to the limitations of traditional searching mechanisms, an employee often times must perform trial and error searches to find a relevant online meeting. For example, an employee can attempt different searches (e.g., by room, by owner, by moderator, etc.) to narrow down the list of online meetings to find the most appropriate meeting room. Consequently, a more effective solution for discovering relevant online meetings is needed. These problems were evaluated, analyzed, and investigated during the course of developing the solutions of the disclosure.

The present disclosure is a solution for utilizing social relationship information to discover a relevant active meeting. In the solution, a user can utilize a search functionality to automatically identify one or more appropriate active online meetings. A meeting server can be automatically searched to discovery a relevant meeting based on social relationships. Social relationship information associated with meeting participants can be determined to establish a participant ranking. The participant ranking can be utilized to generate a meeting ranking which can permit organization of relevant meetings. In one instance, an active list can be generated and conveyed to a user interface. In the instance, the active list can include, meeting title, meeting participants, meeting duration, and the like. In one embodiment, an automated search can be performed periodically to determine relevant meetings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for utilizing social relationship information to discover a relevant active meeting in accordance with an embodiment of the inventive arrangements disclosed herein. Method 100 can be performed in the context of system 200 and/or interface 300. In method 100, an online meeting search (e.g., Web conference search) can be enhanced utilizing relationship information. For example, a user can automatically discover relevant meetings based on the relationship between the user and one or more participants. In one embodiment, a user can interact with a meeting search interface to easily identify meetings of interest. In the embodiment, appropriate meetings can be presented in a ranked order, allowing the user to rapidly select and/or join relevant meetings.

As used herein, an active meeting can refer to an online meeting that is presently being conducted or that is almost ready to be conducted (within an hour of initiating). In one embodiment, an active meeting can be one that is ad hoc, unplanned, unannounced, and the like. An active meeting can also be a meeting that was dynamically rescheduled or relocated, where a current room and/or time may or may not be properly recorded in a calendaring program.

The active meeting can include, but is not limited to, a Web conference, a teleconference, a co-browsing session, a teleconference, a text exchange session, other such meetings, and combinations where some meeting participants are virtual and others are physical. The active meeting can be associated with a collaborative environment (e.g., meeting server), which maintains specifics for meeting times and places. An electronic calendar can be a hardware/software component able to provide functionality including, but not limited to, event planning, meeting organization, address book management, and the like.

In one embodiment, an active meeting can be automatically flagged within a collaborative environment when the meeting is unassociated with a calendar and/or calendar event. In another embodiment, method 100 can include the examination of meeting properties to establish the meeting is an active meeting.

As used herein, a social network can refer to an electronic organization of nodes representing the interdependency between two or more users. Interdependency can include, but is not limited to, shared department, shared organization, similar presence information, a friendship, a kinship, a common interest, a common project, and the like. The social network can include relationship information which can be obtained via one or more traditional and/or proprietary mechanisms. Social networks can utilize context and strength of relationships between people in the social network.

In step 105, an active meeting search can be initiated. The meeting search can be manually and/or automatically initiated. In one embodiment, a user can manually execute a search functionality triggering method 100 to be performed. In another embodiment, the method 100 can be performed at specified intervals. For example, the method 100 can be user configured to be performed every two hours. In step 110, an active meeting can be selected. Selection can be manually and/or automatically performed. Automated selection of active meeting can include, through random selection, by title, by meeting identifier, by room visibility, by participant quantity, by participant identity, by participant topic, and the like. For instance, meetings with higher quantity of participants can be selected prior to meetings with lower quantity of participants.

In step 115, a room associated with the active meeting can be identified. Room properties can be utilized to determine relevancy of the meeting. In one instance, hidden rooms can be selectively omitted from method 100. In step 120, a participant within the room can be selected. Participant selection can be performed by name (e.g., ascending order), by random selection, by privileges, and the like. In step 125, social relationship information associated with the participant can be obtained. Relationship information can include, but is not limited to, social networking relationships, collaborative relationships, presence information, and the like. Social relationship information can be obtained from including, but not limited to, a social networking Web site, a user profile, a historic Web conference, a historic text exchange session, and the like. For instance, recent instant message conversations can be utilized to identify important participants within a meeting.

In step 127, the selected participant can be ranked based on social information. The social information can be utilized to determine a ranking value associated with the participant. Ranking can include traditional and/or proprietary ranking mechanisms. In one embodiment, degrees of separation can be utilized to determine participant ranking For example, participants within a user's network can be ranked higher than a participant outside of a user's network. Ranking can include, but is not limited to, internal ranking values, external ranking values, and the like. Ranking values can include, but are not limited to, numeric values, alphanumeric values, and the like. In step 130, if more participants are within the room, the method can continue to step 135, else return to step 120. Steps 120-130 can be continuously performed for each participant within the room to determine each participant ranking In step 135, the meeting ranking value can be established. Ranking mechanism can be similar or different from participant ranking mechanism. In one embodiment, participant ranking data can be utilized to determine a room ranking In the embodiment, a summation of participant ranking can be computed to establish the room ranking value. Conversely, ranking mechanism can be arbitrarily complex permitting robust ranking capabilities.

In step 140, if more active meetings are available, the method can return to step 110, else continue to step 145. Steps 110-140 can be performed continuously for each active meeting within a collaborative environment. To account for the dynamic nature of online meetings, steps 110-140 can be performed each time a participant is joined or is removed from the meeting. In step 145, an active list can be created. In one instance, the active list can be a search result. In step 150, the active list can be presented within an interface. For example, the active list can be presented within a calendar interface of a calendar software. In step 150, the method can end.

Drawings presented herein are for illustrative purposes only and should not be construed to limit the invention in any regard. Method 100 can be performed in serial and/or in parallel. In one instance, steps 110-140 can be performed in parallel, enabling rapid ranking of active meetings within a collaborative environment. It should be appreciated that method 100 is not limited to a user-initiated search functionality but can be expressed within a Web service, system service, and the like.

Figure 2:
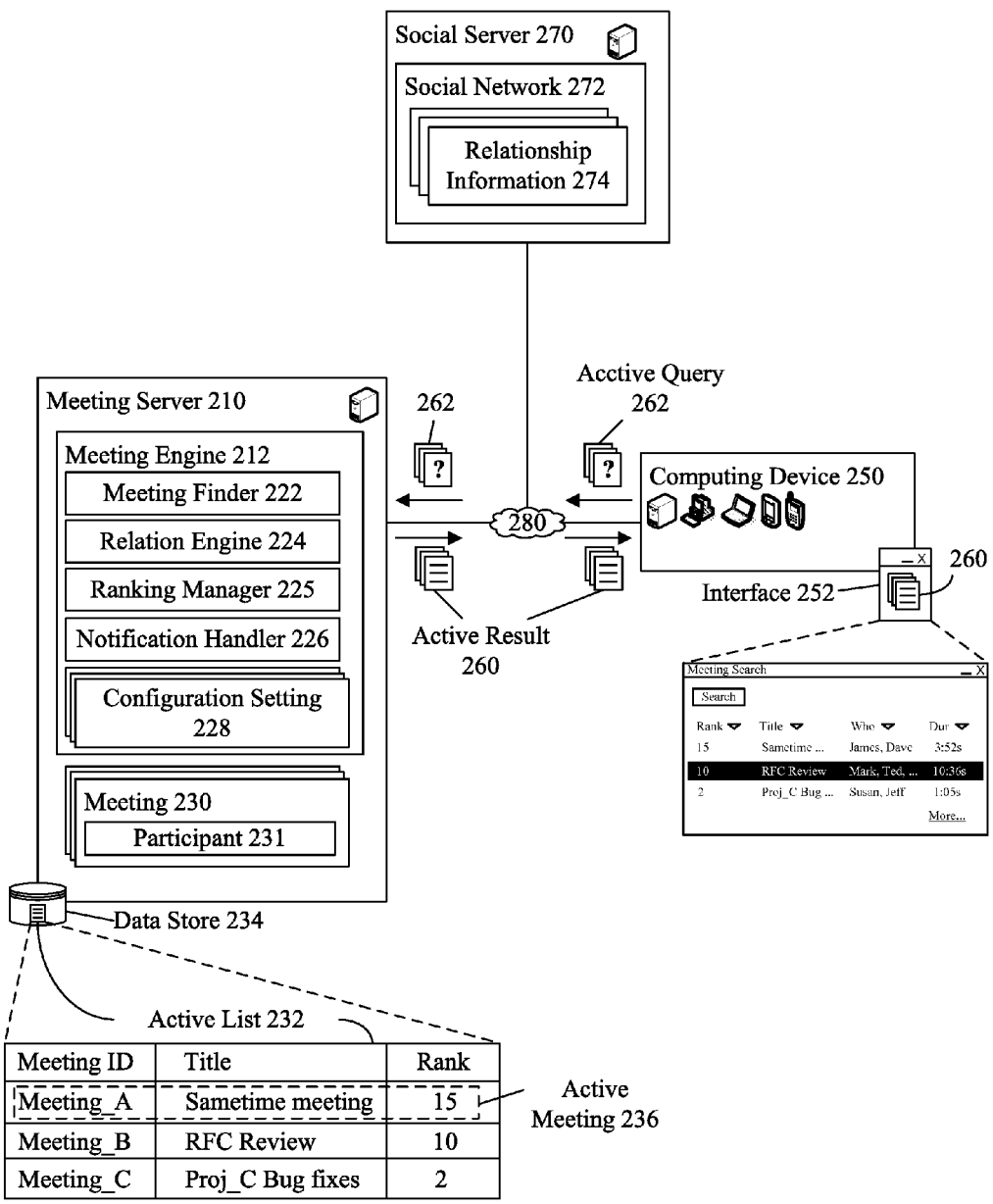
FIG. 2 is a schematic diagram illustrating a system for utilizing social relationship information to discover a relevant active meeting in accordance with an embodiment of the inventive arrangements disclosed herein.

FIG. 2 is a schematic diagram illustrating a system 200 for utilizing social relationship information to discover a relevant active meeting in accordance with an embodiment of the inventive arrangements disclosed herein. System 200 can be present in the context of method 100 and interface 300. In system 300, a meeting server 210 can utilize relationship information 274 to determine a relevant active meeting. Server 210 can examine meeting 230 to determine an active meeting. The meeting engine 212 can utilize relationship information 274 to determine a meeting ranking For example, a meeting can be ranked based on the frequency of participant collaboration with a user. That is, a user's social relationships can be leveraged to aid in discovering appropriate active meetings. In system 200, server 210, device 270, and server 270 can be communicatively linked via network 280.

As used herein, meeting 230 can be one or more scheduled and/or active online meetings. Meeting 230 can include, but is not limited to, a Web conference, a teleconference, a co-browsing session, a text exchange session, and the like. Meeting 230 can include one or more properties including, but not limited to, a meeting title, a meeting identifier, a participant list (e.g., participant 231), a visibility property, a duration, a location, metadata, and the like. Participant 231 can include a user interacting with a computing device to participate within an online meeting. Participant 231 can include, but is not limited to, moderator, privileged user, non-privileged user, and the like.

As used herein, social network 272 can include, but is not limited to, one or more social networks, a social network service, social network aggregator, a distributed social network, and the like. Network 272 can include multiple data sources including, but not limited to, social media, Real Simple Syndication (RSS) feeds, bookmarks, lifestreams, and the like.

Active query 262 can be an electronic request artifact which can be conveyed from computing device 250 to server 210. Query 262 can include, but is not limited to, user information (e.g., credentials), client identifier, user preferences, search parameters, and the like. In one instance, query 262 can conform to traditional and/or proprietary search query formats. In one embodiment, query 262 can be automatically generated in response to an event. For instance, the client can be configured to initiate query 262 for active meetings when a user accesses their calendar.

Active result 260 can be an electronic response artifact conveyed from server 210 to computing device 250. Result 260 can include, but is not limited to, active meeting 236, user identity, client identifier, timestamp, formatting options, and the like. In one embodiment, result 260 can be a search result listing responsive to query 262. In the embodiment, result 260 can be interactively presented within interface 252. In one instance, result 260 can be arbitrarily limited based on user settings, server 210 settings, and the like. For instance, result 260 can include the top three appropriate active meetings likely to be of interest to a user.

Meeting server 210 can be a hardware/software component associated with a meeting 230. Server 210 can include, but is not limited to, meeting engine 212, meeting 230, data store 234, and the like. Server 210 functionality can include, but is not limited to, hosting meeting 230, processing meeting 230 information, receiving active query 262, and the like. In one instance, meeting server 210 can be a portion of a collaboration server. In the instance, meeting server 210 can be a component of an IBM LOTUS SAMETIME SERVER.

Meeting engine 212 can be a hardware/software entity able to discover a relevant active meeting within meeting 230. Meeting engine 212 can include, but is not limited to meeting finder 222, relation engine 224, ranking manager 225, notification handler 226, configuration setting 228, and the like. Engine 212 functionality can include, but is not limited to, processing query 262, facilitating communication between components 222-226, storage and/or retrieval of active list 232, and the like. In one instance, engine 212 can be a networked component communicatively linked to one or more computing devices 250 and/or server 270. It should be understood that components 222-228 can be optional components permitting engine 212 functionality is preserved.

Meeting finder 222 can be a hardware/software component able to analyze meeting 230. Finder 222 can include, but is not limited to a searching algorithm, a sorting algorithm, and the like. Finder 222 functionality can include, but is not limited to, user interface functionality (e.g., processing user search parameters), polling capabilities, and the like. For example, finder 222 can be configured to analyze meeting 230 to identify an active meeting twenty minute intervals.

Relation engine 224 can be a hardware/software element able to identify, obtain, and/or evaluate relationship information 274. Engine 224 functionality can include, but is not limited to, screen scraping functionality, text analysis/parsing capabilities, spidering, graph analysis, metric evaluation, data mining functionality, and the like. In one embodiment, engine 224 can analyze social network 272 to obtain relevant relationship information for a participant 231 of a meeting 230. In the embodiment, participant 231 relationship to a user performing an active meeting search can be analyzed to determine one or more active meetings relevant to the user. It should be understood that engine 224 is not limited to a social network and can include, but is not limited to, a mailing list, a text exchange session, a collaboration database, and the like.

Ranking manager 225 can be a hardware/software entity able to determine participant 231 ranking and/or an active meeting 236 meeting. Manager 225 functionality can include, but is not limited to, a ranking algorithm, a sorting algorithm, and the like. In one instance, ranking manager 224 can include a SOCIALRANK functionality. In one embodiment, manager 225 can permit dynamic ranking of participant 231 accommodating for the changing state of social relationships. In one embodiment, ranking manager 225 can utilize traditional and/or proprietary ranking mechanisms to compute the ranking value of an active meeting.

Notification handler 226 can be a hardware/software component capable of generating and/or conveying a notification to a computing device 250. Handler 226 functionality can include, but is not limited to, customized notification creation, notification formatting, and the like. Handler 226 can communicate a notification utilizing one or more traditional and/or proprietary technologies. Traditional technologies include, but are not limited to, electronic mail, SHORT MESSAGE SERVICE (SMS), MULTIMEDIA MESSAGING SERVICE, and the like. In one instance, notification handler 226 can generate an ASYNCHRONOUS JAVASCRIPT AND EXTENSIBLE MARKUP LANGUAGE (AJAX) notification. In one embodiment, a notification can include an active result 260 detailing information associated with one or more active meetings. For example, active meeting 236 information can be conveyed to interface 252. In one instance, handler 226 can generate real-time or near real-time notifications.

Configuration setting 228 can be one or more parameters for establishing the behavior of engine 212, server 210, and/or system 200. Setting 228 can include finder 222 options, engine 224 settings, manager 225 parameters, handler 226 options, triggers, alerts, customized messages, and the like. Setting 228 can be utilized to manipulate result 260 format, frequency generation, and the like. Setting 228 can include, but is not limited to, user established settings, automatically established settings, and the like. In one instance, setting 228 can be heuristically established.

Social server 270 can be a hardware/software entity associated with social network 272 and relationship information 274. Server 270 can include, but is not limited to, social network 272, social network settings (not shown), and the like. In one instance, server 270 can be a distributed system able to manage social network 272 and/or relationship information 274.

Relationship information 274 can be a data set associated with a participant 231 and/or a user (not shown). Relationship information 274 can include, but is not limited to, node betweenness, node centrality, node closeness, node degree, node cohesion, and the like. Relationship information 274 can include user profile data, user generated data, automatically generated data, metadata, and the like. In one instance, relationship information 274 can include data having an organizational structure. In another instance, relationship information 274 can include data lacking an organization structure. It should be appreciated that relationship information 274 can exist independently of social network 272. That is, relationship information 274 can be present outside the context of a social network 272.

Active list 232 can be an electronic document describing an active meeting 236. Active list 232 can include, but is not limited to, a meeting identifier, a meeting title, a ranking value, a participant list, a timestamp, and the like. For example, active list 232 can identify a Meeting A (e.g., meeting 236) titled "Sametime Meeting" with a ranking of fifteen. In one instance, active list 232 can be dynamically generated in response to a query 262. In another instance, active list 232 can be generated statically based on an interval duration. In one embodiment, active list 232 can be persisted. In the instance, list 232 can be dynamically updated as meetings are created and dissolved.

Computing device 250 can be a hardware/software entity permitting the communication of result 260 and/or query 262. Computing device 250 can include, but is not limited to, a desktop computer, a laptop computer, a tablet computing device, a personal digital assistant (PDA), a mobile phone, and the like. Computing device 250 can be associated with interface 252, search settings (e.g., not shown), human interface device (e.g., keyboard), and the like.

Interface 252 can be a user interactive component permitting interaction with an active result 260. Interface 252 can be a graphical user interface (GUI), voice user interface (VUI), mixed-mode interface, touch sensitive interface, and the like. Interface 252 can include, but is not limited to, desktop interface, Web-based interface, mobile interface, and the like. Interface 252 can present active result 260 which can include relevant online meetings and associated meeting information. For instance, meeting title, meeting ranking, participants of the meeting can be presented within interface 252. In one instance, interface 252 can be utilized to join a meeting associated with active result 260. In one embodiment, interface 252 can be a Web browser executing within a computing device 250.

Data store 234 can be a hardware/software component able to store active list 232. Data store 234 can be a Storage Area Network (SAN), Network Attached Storage (NAS), and the like. Data store 234 can conform to a relational database management system (RDBMS), object oriented database management system (OODBMS), and the like. Data store 234 can be communicatively linked to server 210 in one or more traditional and/or proprietary mechanisms.

Network 280 can be an electrical and/or computer network connecting one or more system 200 components. Network 280 can include, but is not limited to, twisted pair cabling, optical fiber, coaxial cable, and the like. Network 280 can include any combination of wired and/or wireless components. Network 280 topologies can include, but is not limited to, bus, star, mesh, and the like. Network 280 types can include, but are not limited to, Local Area Network (LAN), Wide Area Network (WAN), Virtual Private Network (VPN) and the like.

In one instance, result 260 can be persisted to enable common searches to be rapidly executed. That is, results from historically executed searches can be cached to reduce resource consumption and decrease search time.

Drawings presented herein are for illustrative purposes only and should not be construed to limit the invention in any regard. It should be noted that the disclosure can represent a "drop-in" solution for traditional engine protection approaches. That is, system 200 can be integrated within an existing online meeting framework without requiring extensive changes to the existing framework. System 200 can be a component of a distributed network environment, distributed computing system, and the like.

System 200 illustrates one embodiment utilizing a client-server architecture. It should be appreciated that system 200 is not limited to the exemplary architecture described herein. In one embodiment, the disclosure can be encapsulated within a Web service, an application programming interface (API), desktop widget, and the like. System 200 can capabilities can include synchronous, asynchronous, and the like. In one instance, system 200 can conform to a publish/subscribe mechanism. Further it should be appreciated that system 200 can be a real-time or near real-time system capable of identifying relevant active meetings rapidly within a collaborative environment.

Figure 3:
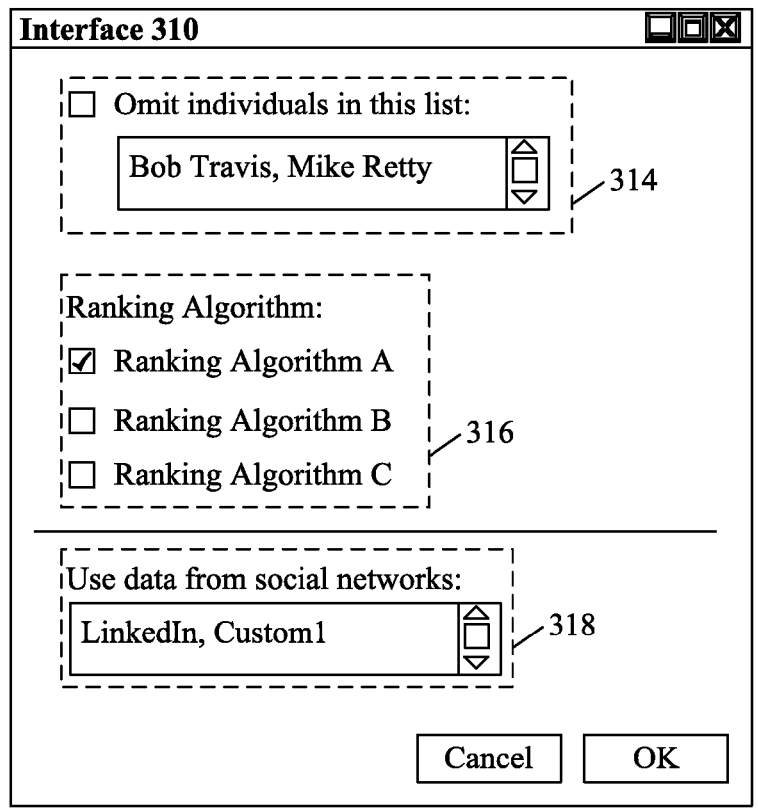
FIG. 3 is a schematic diagram illustrating an interface for utilizing social relationship information to discover a relevant active meeting in accordance with an embodiment of the inventive arrangements disclosed herein.

FIG. 3 is a schematic diagram illustrating an interface 310 for utilizing social relationship information to discover a relevant active meeting in accordance with an embodiment of the inventive arrangements disclosed herein. Interface 310 can be present in the context of method 100 and/or system 200. In interface 310, user configurable options for active meeting discovery can be presented. Configuration options 314-318 can permit customization of active search discovery. Interface 310 can conform to traditional and/or proprietary interface layouts. For example, interface can be a traditional pop-up dialog window. In one instance, interface 310 can be a screen of a collaboration software application.

In option 314, participants can be selectively omitted to enhance search accuracy. Option 314 can permit multiple participants to be specified allowing flexible search criteria. In one instance, option 314 can be text area which can receive user input. In another instance, option 314 can automatically present suggested participants. For example, option 314 can present participants not within a user's social network allowing users to refine a meeting search quickly.

In option 316, a ranking algorithm can be selected to permit ranking of a participant and/or a meeting. In one instance, a single ranking algorithm can be specified within option 316. For example, ranking algorithm A can be selected to evaluate a meeting relevance. In another instance, option 316 can permit multiple ranking algorithms to be combined, permitting complex ranking solutions. Ranking algorithms presented within option 316 can include traditional and/or proprietary ranking algorithms.

In option 318, one or more social data sources can be utilized in determining participant and/or meeting relevance. In one instance, option 318 can allow configuration of a social data source. In the instance, each data source within option 318 can require a user to enter user credentials for the data source. For instance, in option 318 a user can be prompted to specify a username and password allowing data to be obtained from a LinkedIn account.

Drawings presented herein are for illustrative purposes only and should not be construed to limit the invention in any regard. Interface 310 elements can include, but is not limited to, checkboxes, radio dialogs, text boxes, text areas, multi-line selection boxes, and the like. Interface 310 can be a graphical user interface (GUI), voice user interface (VUI), mixed-mode interface, text-based interface, and the like. Functionality expressed within interface 310 can be presented within a file menu, a context menu, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
identifying a plurality of different meetings within a collaborative environment, wherein each of the meetings are active meetings, wherein each of the different meetings are associated with at least one of a meeting identifier, a ranking value, and a plurality of participants, wherein the collaborative environment is an electronic meeting system;
determining, by one or more processors, the relationship information of the plurality of participants to a specified entity, wherein the relationship information is at least one of a social network relationship, presence information, and collaboration metadata;
programmatically establishing, by one or more processors, a ranking value for each of the meetings based on the relationship information, wherein the ranking value is at least one of a numerical value and an alphanumeric value;
ordering or filtering, by one or more processors, the meetings relative based on the ranking value;
responsive to the ordering of the meetings, conveying, by one or more processors, a real-time notification indicating the meetings in order and indicating that the meetings match a plurality of user-established criteria; and
presenting, by one or more processors, the real-time notification to a user within an interface of a computing device, wherein the notification comprises meeting information for the meetings.

2. The method of claim 1, wherein the meeting is at least one of a Web conference, a co-browsing session, a teleconference, and a text exchange session.

3. The method of claim 1, wherein the active meeting is not associated with an electronic calendar event or a record in any electronic calendar system that has recorded a proper location and time for the active meeting.

4. The method of claim 1, wherein the specified entity is a human agent performing a meeting search within the collaborative environment.

5. The method of claim 1, wherein the relationship information is obtained from at least one social networking resource, wherein the social networking resource is a social networking Web site.

6. The method of claim 1, further comprising:
responsive to identifying, conveying a real-time notification indicating a meeting is matching a plurality of user-established criteria;

presenting the real-time notification to a user within an interface, wherein the notification comprises of meeting information.

7. The method of claim 6, wherein the meeting information is at least one of a meeting title, a meeting identifier, a participant list, a meeting duration, and a meeting location.

8. The method of claim 6, further comprising:
automatically joining the user to the meeting responsive to the conveying, wherein the user is associated with a search action, wherein the search action programmatically executes the identifying, determining, and establishing of the method.

9. The method of claim 1, further comprising:
automatically omitting a meeting when the meeting is associated with a hidden room, wherein the hidden room is an online room with no visibility.

10. The method of claim 6, wherein the method is performed automatically at specified intervals.

11. A system comprising:
one or more processors;
one or more memories storing program instructions executable by the one or more processors, wherein execution of the program instructions by the one or more processors causes at least one machine to:
identify a plurality of different meetings within a collaborative environment, wherein each of the meetings are active meetings, wherein each of the different meetings are associated with at least one of a meeting identifier, a ranking value, and a plurality of participants, wherein the collaborative environment is an electronic meeting system;
determine the relationship information of the plurality of participants to a specified entity, wherein the relationship information is at least one of a social network relationship, presence information, and collaboration metadata;
programmatically establish a ranking value for each of the meetings based on the relationship information, wherein the ranking value is at least one of a numerical value and an alphanumeric value;
order or filter the meetings relative based on the ranking value;
responsive to ordering or filtering the meetings, convey a real-time notification indicating the meetings in order and indicating that the meetings match a plurality of user-established criteria; and
present the real-time notification to a user within an interface of a computing device, wherein the notification comprises meeting information for the meetings.

12. The system of claim 11, wherein the specified entity is a human agent performing a meeting search within the collaborative environment.

13. The system of claim 11, wherein the meeting is at least one of a Web conference, a co-browsing session, a teleconference, and a text exchange session.

14. The system of claim 11, wherein the active meeting is an online meeting not linked with a calendar event or record of any calendaring or meeting system that records the time and location of the active meeting.

15. The system of claim 11, wherein the ranking value is determined by at least one ranking function of a ranking algorithm.

16. An apparatus comprising:
a memory storing at least one computer program product;
a processor operable to execute the computer program product to cause the interface window to be displayed by the display hardware; and
the computer program product when executed by the processor being operable to identify a plurality of different meetings within a collaborative environment, wherein each of the meetings are an active meeting, wherein each of the different meetings are associated with at least one of a meeting identifier, a ranking value, and a plurality of participants, wherein the collaborative environment is an electronic meeting system;
the computer program product when executed by the processor being operable to determine the relationship information of the plurality of participants to a specified entity, wherein the relationship information is at least one of a social network relationship, presence information, and collaboration metadata;
the computer program product when executed by the processor being operable to programmatically establish a ranking value for each of the meetings based on the relationship information, wherein the ranking value is at least one of a numerical value and an alphanumeric value;
the computer program product when executed by the processor being operable to order or filter the meetings relative based on the ranking value;
the computer program product when executed by the processor being operable to, responsive to the ordering of the meetings, convey a real-time notification indicating the meetings in order and indicating that the meetings match a plurality of user-established criteria; and
the computer program product when executed by the processor being operable to present the real-time notification to a user within an interface, wherein the notification comprises meeting information for the meetings.

17. The apparatus of claim 16, wherein the active meeting is an online meeting not linked with a calendar event or record of any calendaring or electronic meeting system that records the correct time and location of the active meeting.

18. The apparatus of claim 16, wherein the meeting is at least one of a Web conference, a co-browsing session, a teleconference, and a text exchange session.

19. The apparatus of claim 16, wherein the specified entity is a human agent performing a meeting search within the collaborative environment.

20. The apparatus of claim 16, wherein the relationship information is obtained from at least one social networking resource, wherein the social networking resource is a social networking Web site.

21. A computer program product comprising:
at least one computer usable storage medium having computer usable program code digitally encoded therewith, the computer usable program code comprising:
computer usable program code configured to identify a plurality of different meetings within a collaborative environment, wherein each of the meetings are an active meeting, wherein each of the different meetings are associated with at least one of a meeting identifier, a ranking value, and a plurality of participants, wherein the collaborative environment is an electronic meeting system;
computer usable program code configured to determine the relationship information of the plurality of participants to a specified entity, wherein the relationship information is at least one of a social network relationship, presence information, and collaboration metadata;
computer usable program code configured to programmatically establish a ranking value for each of the meetings based on the relationship information, wherein the ranking value is at least one of a numerical value and an alphanumeric value;

computer usable program code configured to order or filter the meetings relative based on the ranking value;

computer usable program code configured to, responsive to the ordering of the meetings, convey a real-time notification indicating the meetings in order and indicating that the meetings match a plurality of user-established criteria; and computer usable program code configured to present the real-time notification to a user within an interface, wherein the notification comprises meeting information for the meetings.

22. The computer program product of claim 21, wherein the meetings are ordered based on the ranking value.

23. The computer program product of claim 21, wherein the meetings are filtered based on the ranking value.

24. The computer program product of claim 21, wherein the active meeting is not associated with an electronic calendar event or a record in any electronic calendar system that has recorded a proper location and time for the active meeting.

25. The computer program product of claim 21, wherein the meeting is at least one of a Web conference, a co-browsing session, a teleconference, and a text exchange session, wherein the specified entity is a human agent performing a meeting search within the collaborative environment, wherein the relationship information is obtained from at least one social networking resource, wherein the social networking resource is a social networking Web site.

* * * * *